US012570528B2

(12) United States Patent
Golden et al.

(10) Patent No.: US 12,570,528 B2
(45) Date of Patent: Mar. 10, 2026

(54) HYDROGEN PURIFICATION BY ADSORPTION

(71) Applicant: Air Products and Chemicals, Inc., Allentown, PA (US)

(72) Inventors: Timothy Christopher Golden, Nevez (FR); Shubhra Jyoti Bhadra, Naperville, IL (US); Shreya Mukherjee, Allentown, PA (US); Garret C. Lau, New Tripoli, PA (US); Jeffrey R. Hufton, Fogelsville, PA (US); Jay A. Thakkar, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 354 days.

(21) Appl. No.: 18/200,127

(22) Filed: May 22, 2023

(65) Prior Publication Data

US 2024/0390835 A1     Nov. 28, 2024

(51) Int. Cl.
| | |
|---|---|
| *C01B 3/50* | (2006.01) |
| *B01D 53/04* | (2006.01) |
| B01D 53/047 | (2006.01) |
| B01J 20/16 | (2006.01) |
(Continued)

(52) U.S. Cl.
CPC ............ *C01B 3/50* (2013.01); *B01D 53/0407* (2013.01); *B01D 53/047* (2013.01); *B01D 2253/1085* (2013.01); *B01D 2253/30* (2013.01); *B01D 2253/308* (2013.01); *B01D 2256/16* (2013.01); *B01D 2257/102* (2013.01); *B01D 2257/11* (2013.01); *B01D 2259/4143* (2013.01); *B01J 20/165* (2013.01); *B01J 20/20*

(2013.01); *B01J 20/28004* (2013.01); *B01J 20/28064* (2013.01); *B01J 20/28073* (2013.01); *B01J 20/2808* (2013.01); *C01B 2210/0018* (2013.01);
(Continued)

(58) Field of Classification Search
None
See application file for complete search history.

(56) References Cited

U.S. PATENT DOCUMENTS

| | | |
|---|---|---|
| 3,176,444 A | 4/1965 | Kiyonaga |
| 3,430,418 A | 3/1969 | Wagner |
| 3,564,816 A | 2/1971 | Batta |
(Continued)

FOREIGN PATENT DOCUMENTS

| | | | | |
|---|---|---|---|---|
| EP | 0576715 A1 * | 1/1994 | ............... | G21F 3/02 |
| EP | 0963777 | 9/2003 | | |

OTHER PUBLICATIONS

Peter et al. (2005). Adsorption of nitrogen, oxygen, and argon in mono-, di-, and trivalent cation-exchanged zeolite mordenite. Industrial & engineering chemistry research, 44(17), 6856-6864.) (Year: 2005).*
(Continued)

*Primary Examiner* — Gabriel E Gitman
(74) *Attorney, Agent, or Firm* — Jason M. Ploeger

(57) ABSTRACT

A method for purifying a crude hydrogen feed stream utilizes an adsorbent having a N2/Ar selectivity ranging from 2 to 4 at 30° C. and a Henry's law coefficient for argon ranging from 0.15 to 1.0 mmole/g/atma at 30° C. The composition of crude hydrogen streams from processes in which carbon dioxide is captured necessitates new criteria for adsorbent selection to improve recovery.

18 Claims, 6 Drawing Sheets

(51) Int. Cl.
*B01J 20/20* (2006.01)
*B01J 20/28* (2006.01)

(52) U.S. Cl.
CPC ................. *C01B 2210/0046* (2013.01); *C01B 2210/0053* (2013.01); *C01B 2210/0082* (2013.01)

(56) References Cited

U.S. PATENT DOCUMENTS

| | | | |
|---|---|---|---|
| 3,986,849 A | 10/1976 | Fuderer et al. | |
| 4,077,780 A | 3/1978 | Doshi | |
| 6,261,343 B1 | 7/2001 | Golden et al. | |
| 6,302,943 B1 | 10/2001 | Johnson et al. | |
| 6,468,328 B2 | 10/2002 | Sircar et al. | |
| 7,404,846 B2 | 7/2008 | Golden et al. | |
| 7,537,742 B2 | 5/2009 | Baksh et al. | |
| 7,713,333 B2 | 5/2010 | Rege et al. | |
| 12,208,354 B2 * | 1/2025 | Jain ........................ B01D 53/04 | |
| 2006/0236863 A1 | 10/2006 | Weist, Jr. et al. | |
| 2006/0254425 A1 * | 11/2006 | Baksh ............... B01J 20/28052 96/132 | |
| 2021/0138404 A1 * | 5/2021 | Ihara .................... B01J 20/2808 | |

OTHER PUBLICATIONS

M. Luberti, et al, "Design of a H2 PSA for cogeneration of ultrapure hydrogen and power at an advanced integrated gasification combined cycle with pre-combustion capture", Adsorption, 2014, 20, 511-524.

S. A. Peter, et al, "Adsorption of Nitrogen, Oxygen, and Argon in Mono-, Di-, and Trivalent Cation-Exchanged Zeolite Mordenite", Ind. Eng. Chem. Res., 2005, 44, 17, 6856-6864.

R. Kumar, et al, "A Versatile Process Simulator for Adsorptive Separations", Chemical Engineering Science, 1994, 49 (18), 3115-3125.

* cited by examiner

| F1 | F2 | F3 | F4 | EQ1D | EQ2D | EQ3D | EQ4/PPU1 | PPU2 | CnD1 | CnD2 | RPU1 | RPU2 | EQ4R | EQ3R | EQ2R | EQ1R/RP1 | RP2 |
|---|---|---|---|---|---|---|---|---|---|---|---|---|---|---|---|---|---|
| F3 | F4 | EQ1D | EQ2D | EQ3D | EQ4D/PPU1 | PPU2 | CnD1 | CnD2 | RPU1 | RPU2 | EQ4R | EQ3R | EQ2R | EQ1R/RP1 | RP2 | F1 | F2 |
| EQ1D | EQ2D | EQ3D | EQ4D/PPU1 | PPU2 | CnD1 | CnD2 | RPU1 | RPU2 | EQ4R | EQ3R | EQ2R | EQ1R/RP1 | RP2 | F1 | F2 | F3 | F4 |
| EQ3D | EQ4D/PPU1 | PPU2 | CnD1 | CnD2 | RPU1 | RPU2 | EQ4R | EQ3R | EQ2R | EQ1R/RP1 | RP2 | F1 | F2 | F3 | F4 | EQ1D | EQ2D |
| PPU2 | CnD1 | CnD2 | RPU1 | RPU2 | EQ4R | EQ3R | EQ2R | EQ1R/RP1 | RP2 | F1 | F2 | F3 | F4 | EQ1D | EQ2D | EQ3D | EQ4D/PPU1 |
| CnD2 | RPU1 | RPU2 | EQ4R | EQ3R | EQ2R | EQ1R/RP1 | RP2 | F1 | F2 | F3 | F4 | EQ1D | EQ2D | EQ3D | EQ4D/PPU1 | PPU2 | CnD1 |
| RPU2 | EQ4R | EQ3R | EQ2R | EQ1R/RP1 | RP2 | F1 | F2 | F3 | F4 | EQ1D | EQ2D | EQ3D | EQ4D/PPU1 | PPU2 | CnD1 | CnD2 | RPU1 |
| EQ3R | EQ2R | EQ1R/RP1 | RP2 | F1 | F2 | F3 | F4 | EQ1D | EQ2D | EQ3D | EQ4D/PPU1 | PPU2 | CnD1 | CnD2 | RPU1 | RPU2 | EQ4R |
| EQ1R/RP1 | RP2 | F1 | F2 | F3 | F4 | EQ1D | EQ2D | EQ3D | EQ4D/PPU1 | PPU2 | CnD1 | CnD2 | RPU1 | RPU2 | EQ4R | EQ3R | EQ2R |

Fig. 1

HYDROGEN PURIFICATION BY ADSORPTION

BACKGROUND

The present disclosure relates to adsorption processes, and more particularly to hydrogen purification by pressure swing adsorption (PSA). Hydrogen purification by PSA supplies hydrogen to chemical processing, metals refining, petroleum refining, and other related industries. Typical commercial hydrogen production processes include partial oxidation or reforming of natural gas or other hydrocarbons, followed by further shifting of carbon monoxide and water to make additional hydrogen and carbon dioxide. The resulting synthesis gas comprises hydrogen, along with impurities such as water, nitrogen, carbon monoxide, methane and carbon dioxide. Typically, hydrogen is separated from the gas mixture and the remaining waste gas is used as fuel for steam production. Carbon dioxide formed from the natural gas or hydrocarbon feedstock is released to the atmosphere. This mode of hydrogen production is termed 'grey'. In an attempt to eliminate industrial carbon dioxide emissions, "blue" hydrogen may be produced by capturing the carbon dioxide before extracting the hydrogen product. When the hydrocarbon feedstock is partially oxidized by oxygen separated from the air, the most weakly adsorbing impurities remaining in the crude hydrogen stream are nitrogen from the feedstock and argon from the oxygen. When compared to a crude hydrogen stream from a grey process, the impurities in a crude hydrogen stream from a blue hydrogen process have a different composition and a lower overall concentration. These changes require changes to the design and operation of the hydrogen purification PSA.

BRIEF DESCRIPTION OF THE DRAWINGS

The present invention will hereinafter be described in conjunction with the appended figures wherein like numerals denote like elements:

FIG. 1 shows a diagram of a 10-bed PSA cycle with 2 beds on feed and 4 equalization steps.

DETAILED DESCRIPTION

Figure 2:
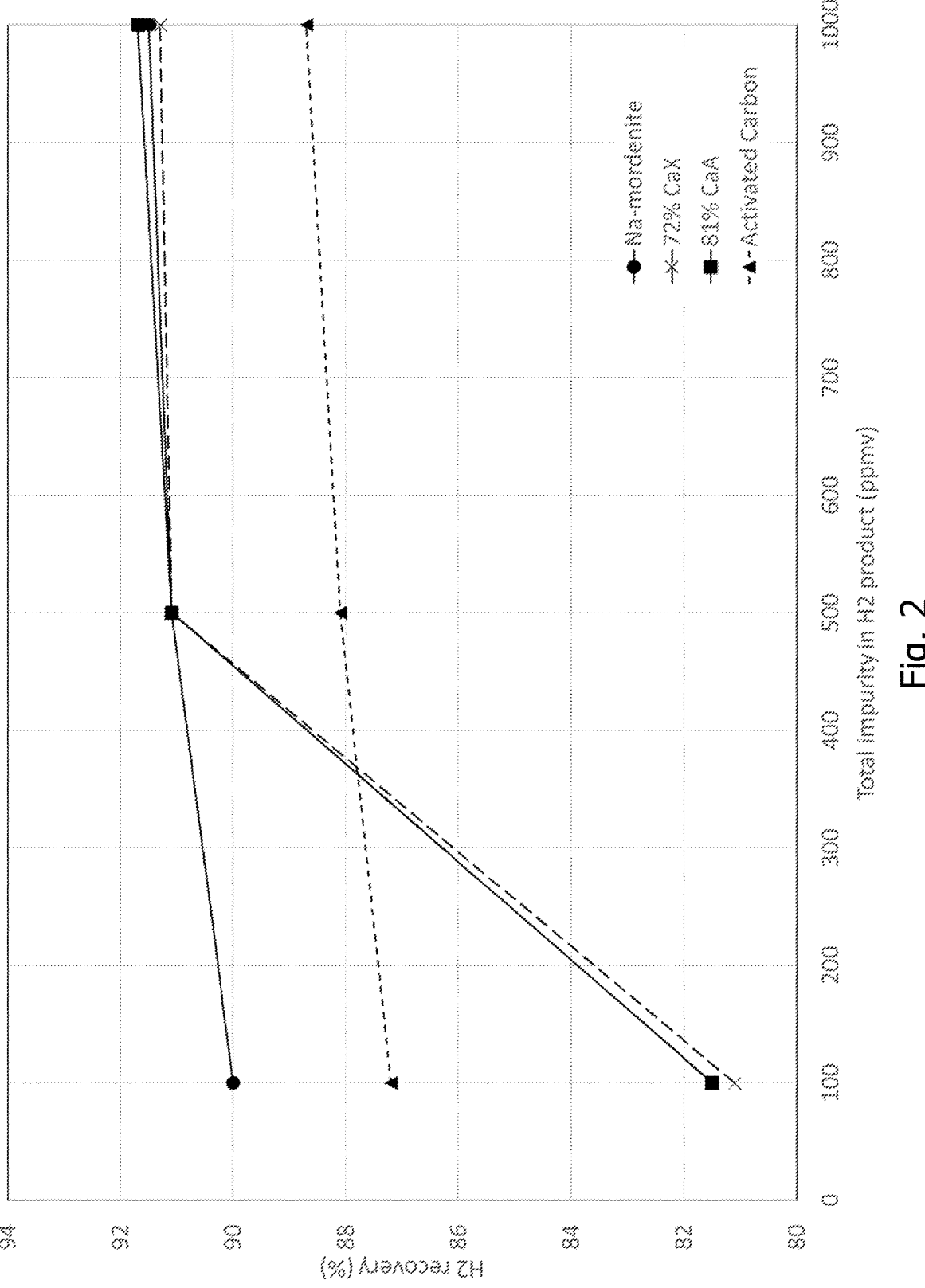
FIG. 2 shows a plot of H2 recovery as a function of total impurities in the hydrogen product.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

Henry's law constants $(K_H)$ for a given gas species are defined as the slope of the isotherm as pressure approaches zero. For a detailed explanation of Henry's law constants with respect to adsorption, see "Physical Adsorption of Gases," D. M. Young and A. D. Crowell, p. 104 (Butterworths, London 1962). The units of the constant are amount of gas adsorbed per unit weight of adsorbent per unit of pressure (e.g. mole of gas adsorbed/gram of adsorbent/atmosphere of pressure).

Selectivity is defined as the ratio of two Henry's law constants, for example the nitrogen/argon selectivity $S(N_2/Ar)$ is equal to $K_H(N_2)/K_H(Ar)$. By definition selectivity is unitless.

In a pressure swing adsorption (PSA) process a plurality of adsorbent beds go through a cycle of steps including adsorption (where the hydrogen product stream is withdrawn), depressurization (where some gas is used to repressurize other beds and some leaves as a tail gas stream), purge (where an essentially pure hydrogen gas stream is introduced to remove one or more of the impurities), and repressurization (where gas from depressurization steps or the crude hydrogen feed stream is used to increase the pressure of the bed to the feed pressure). PSA cycles may be characterized by the total number of beds, the number of beds on feed at a given point in the cycle, and the number of equalization steps (defined as a coupled depressurization-repressurization step) a given bed takes over a full cycle. Fuderer et al. (U.S. Pat. No. 3,986,849) provide a useful background for PSA cycle development and nomenclature.

A H2 purification PSA designed for a grey process such as a conventional steam methane reformer (SMR) may be used for a blue H2 process, but will suffer from lower H2 recovery due to differences in the crude H2 pressure, feed composition, and product purity specification. The crude H2 pressure in a grey SMR process may range from 31 to 39 atm. A blue process such as partial oxidation or autothermal reforming may produce crude H2 at a pressure ranging from 41 to 56 atm, or from 41 to 70 atm, to facilitate carbon capture.

In a grey SMR process the controlling impurities, that is the impurity whose breakthrough in the PSA dictates the overall H2 product purity, is typically CO and/or N2. In a blue H2 process, carbon removal combined with oxygen enrichment introducing Ar to the syngas make the controlling impurity N2 and/or Ar. The compositions of the two crude H2 streams are compared in Table 1. All concentrations are given on a volume basis.

TABLE 1

|  | Grey H2 (SMR) | Blue H2 |
| --- | --- | --- |
| H2 | 67-80% | 90-99% |
| Ar | 0% | 0.01-0.3% |
| N2 | 0.05-1.0% | 0.1-3.5% |
| CO | 1-4% | 0.1-1.5% |
| CO2 | 15-20% | 0.001-0.15% |
| CH4 | 4-8% | 0.1-3.0% |

The concentration of Ar in the crude H2 is a function of the O2 purity as higher purity (and thus more expensive) O2 will introduce less Ar into the crude H2 stream. There will be an optimum in shifting the cost of Ar removal between the air separation step and the PSA.

As a noble gas, Ar is weakly adsorbing compared to N2, so purifying a crude H2 stream containing Ar will require an adsorbent with sufficiently high $K_H(Ar)$ value. The adsorbent may have a $K_H(Ar)$ value ranging from 0.15 to 1.4 mmole/g/atm, or from 0.15 to 1.0 mmole/g/atm, or from 0.15 to 0.4 mmole/g/atm, at 30° C.

The nitrogen/argon selectivity is also a key parameter since for adsorbents with higher S(N2/Ar) values the stronger-adsorbing N2 can push Ar off of the adsorbent and into the product H2 (often referred to as Ar roll-up). At high purity specs where the product gas stream may be dominated by Ar, crude H2 may be purified using an adsorbent with a high $K_H(Ar)$ value and a low N2/Ar selectivity. However, the inventors have found that it is preferable to have both N2 and Ar break through at substantially the same time and thus have the product gas stream comprise both N2 and Ar. This simultaneous breakthrough allows the overall recovery to be less sensitive to the purity of the H2 product. A low N2/Ar selectivity corresponds to a low $K_H(N2)$ value and an insufficient capacity to remove N2. The inventors have found that in order to achieve this breakthrough of both N2 and Ar the N2/Ar selectivity at 30° C. should range from 2 to 4. Above this range an excess of Ar is pushed off by N2, which results in a sharp drop-off of recovery as the H2 product purity increases. Below this range H2 recovery suffers due to the large bed sizes required which result in H2 losses in the voids. Previous work in the literature teaches adsorbent selection based on $K_H$ values, not selectivity. Part of the reason for this is the higher concentration of CO in traditional SMR crude hydrogen streams pushes N2 off of the bed, so the effect of N2 pushing a weaker-adsorbed species off the bed has not been observed.

Adsorbents with the desired N2/Ar selectivity at 30° C. ranging from 2 to 4 and $K_H(Ar)$ at 30° C. ranging from 0.15 to 1.4 mmole/g/atm include Na-mordenite, Li/Na-mordenite, Ca/Na-mordenite, La/Na-mordenite, Ce/Na-mordenite, Na-ZSM-5, and Na-ferrierite. Detailed parameters for the mordenite adsorbents may be found in Peter et al. (Industrial & Engineering Chemistry Research, 2005, 44, 17, p. 6856-64). Adsorbents with the most favorable isotherm shapes may have a Si/Al ratio ranging from 2.5 to 50 and may contain lower charge density cations, e.g. $Na^+$ rather than $Ca^{2+}$. Zeolites with preferred characteristics may be exchanged with greater than or equal to 30% $Na^+$. The ideal range of zeolite pore sizes may range from 3.3 Å (below which gas molecules cannot access the pores) to 8 Å (above which van der Waals interactions are weaker, leading to lower Henry's law constants for Ar). The Si/Al ratio in Na-ZSM-5 ranges from 2.55 to 50, Na-ferrierite from 3 to 10, and Na-mordenite from 4 to 10, and all three adsorbents share adsorption sites in pores ranging from 4-6 Å. In contrast, adsorbents such as 4A and NaX have larger internal pores of around 10 Å. Zeolites with preferred characteristics may also share a Si/Al ratio ranging from 2.5 to 50, or ranging from 3 to 10, or ranging from 5 to 10. Zeolites with preferred characteristics may also share an orthorhombic crystal structure. Zeolite geometry may be found through the Database of Zeolite Structures (http://www.izastructure.org/databases/) containing zeolite framework types approved by the Structure Commission of the International Zeolite Association.

Adsorbent performance is also a function of the heat of adsorption of Ar in the Henry's law limit, or q(Ar). Heat of adsorption in the Henry's law limit is defined by the Henry's law limit as a function of temperature:

$$\frac{d}{dT}\ln(K_H) = \frac{q}{RT^2}$$

where T is the temperature and R is the gas constant. Adsorbents may be selected with a q(Ar) ranging from 3.9 to 5.3 kcal/mol, or from 4 to 5 kcal/mol. An adsorbent with too low of a q(Ar) value corresponds to low capacity for Ar, such as 4A. Conversely, argon will adsorb so strongly to an adsorbent with too high of a q(Ar), such as Ca-chabazite, that a lot of purge is required in the adsorption cycle, lowering the recovery.

Similarly, the heat of adsorption of H2 in the Henry's law limit, or q(H2), as well as the Henry's law constant of H2, $K_H(H2)$, affect adsorbent performance. An adsorbent with a high heat of adsorption of H2 will adsorb H2 too strongly, leading to more H2 being left on the bed prior to the final blowdown step. The gas from the final blowdown step is eventually sent to the vent, so H2 losses will lower the overall H2 recovery. Na-mordenite outperforms activated carbon in this application, at least in part, due to the latter adsorbing H2 more strongly than the former. The heat of adsorption, q(H2), is 1.7 kcal/mol on Na-mordenite and 2.3 kcal/mol on activated carbon. The Henry's law constant, $K_H(H2)$, is 0.018 mmol/g/atm on Na-mordenite and 0.027 mmol/g/atm on activated carbon. Adsorbents may be selected with a q(H2) less than 2.3 kcal/mol and a $K_H(H2)$ less than 0.027 mmol/g/atm.

By comparison, activated carbon has a N2/Ar selectivity ranging from 0.9 to 1.3, making it more suitable as a primary adsorbent for cases with a high product purity requirement particularly with respect to Ar impurity levels. However, an adsorbent with a $K_H(Ar)$ greater than 0.3 mmol/g/atm, such as activated carbon, may be used as an additional layer on the feed end in the PSA in combination with an adsorbent with a N2/Ar selectivity ranging from 2 to 4 and $K_H(Ar)$ ranging from 0.15 to 1.0 mmole/g/atm. At H2 product purity requirements at or below 99.95%, the addition of an activated carbon layer can improve overall H2 recovery. Typically, adsorbent selection is not a function of product purity. In at least some embodiments, the activated carbon layer may be between 10% and 30% of the total bed.

In at least some embodiments, two or more adsorbent materials may be physically mixed to produce an adsorbent with a mass-averaged N2/Ar selectivity ranging from 2 to 4 and a mass-averaged $K_H(Ar)$ ranging from 0.15 to 1.0 mmole/g/atm to improve overall H2 recovery. The mass-averaged $K_H(Ar)$ is calculated as the sum of the product of the mass fraction of each adsorbent times its Ar Henry's law constant at 30 C. Likewise, the mass-averaged $K_H(N2)$ is calculated as the sum of the product of the mass fraction of each adsorbent times its N2 Henry's law constant at 30 C. The mass averaged N2/Ar selectivity is calculated as the ratio of the mass-averaged $K_H(N2)$ divided by the mass-averaged $K_H(Ar)$. The benefits of a physical mixture of adsorbents may be most apparent when the concentration of Ar in the crude hydrogen stream is greater than or equal to 0.1%. Physical mixtures may allow the tuning of the mass-averaged N2/Ar selectivity and the mass-averaged $K_H(Ar)$. In the case of a mixture of 5% to 50% by weight activated carbon and the balance CaA, the physical mixture with a mass-averaged N2/Ar selectivity ranging from 2 to 4 and a mass-averaged $K_H(Ar)$ ranging from 0.15 to 1.0 mmole/g/atm provides higher H2 recovery than a single layer of either adsorbent alone, or the same amount of each adsorbent in two separate layers.

In order to remove other contaminants such as water vapor and CO2, a guard layer at the feed end of the PSA may be used. The guard layer may comprise any combination of suitable adsorbents such as activated alumina, narrow pore silica gel, and wide pore silica gel. In at least some embodiments the guard layer may range from 0.3 to 1.5 m of total bed length.

Example 1

The performance of a hydrogen PSA was simulated for a number of adsorbent materials using proprietary software that solves the heat, mass, and momentum balances in an adsorption bed. This software package was used for all examples to come. Specifics of the simulation package can be found in Kumar et al, Chemical Engineering Science, 49 (18), 3115, 1994. The feed for all cases comprised 97.68% H2, 0.74% N2, 0.05% Ar, 0.25% CH4, 0.24% CO2, and 1.04% CO (all on a mol basis) at 30 bar and 38° C.

The PSA cycle simulated was a 10-bed cycle with 2 beds on feed and 4 equalization steps (10/2/4) and is shown in FIG. 1. The steps each bed progresses through are listed from left to right with the following abbreviations: F (F1 to F4): feed, EQ1D: top equalization depressurization 1, EQ2D: top equalization depressurization 2, EQ3D: top equalization depressurization 3, EQ4D/PPU1: top equalization depressurization 4 with provide purge 1, PPU2: provide purge 2, CnD (1,2): counter-current depressurization, RPU (1,2): receiving purge from bed, EQ4R: top equalization re-pressurization 4, EQ3R: top equalization re-pressurization 3, EQ2R: top equalization re-pressurization 2, EQ1R/RP1: top equalization re-pressurization 1 with early product re-pressurization 1 and RP2: product re-pressurization.

The adsorbents simulated were activated carbon, CaA with 81% Ca exchange (Ca equivalents/total exchange equivalents), CaX with 72% Ca exchange, NaX, 4A, silicalite, chabazite with 88% Ca exchange, and Na-mordenite. The activated carbon used had a surface area of 750 m2/g, a total open pore volume 0.55 cc/g based on Hg and He density and an average particle size of 1.7 mm. The zeolites tested were also of particle size 1.7 mm. The simulations in this example were conducted with a single layer of adsorbent.

Table 2 shows the experimentally measured Henry's law constants and selectivity at 30° C. after regeneration in flowing N2 at 400° C., the heat of adsorption of Ar in the Henry's law limit, and the silicon to aluminum ratio when applicable.

TABLE 2

| Adsorbent | K H N2 at 30 C. | K H Ar at 30 C. | S N2/Ar | q (Ar) (kcal/mol) | Si/Al ratio |
|---|---|---|---|---|---|
| Na-mordenite | 0.82 | 0.27 | 3.04 | 4.37 | 5 |
| Na-ZSM-5 | 0.49 | 0.22 | 2.23 | 4.20 | 30 |
| 61% Na-Ferrierite | 0.70 | 0.19 | 3.68 | 4.37 | 5.2 |
| Activated carbon | 0.44 | 0.35 | 1.25 | 3.52 | N/A |
| 4A | 0.24 | 0.08 | 3.11 | 3.41 | 1 |
| NaX | 0.31 | 0.12 | 2.67 | 3.38 | 1.25 |
| 81% CaA | 0.70 | 0.15 | 4.56 | 3.52 | 1 |
| 72% CaX | 1.08 | 0.15 | 7.29 | 3.82 | 1.25 |
| Ca-chabazite | 58.1 | 1.63 | 35.7 | 5.38 | 2.1 |
| Silicalite | 0.19 | 0.18 | 1.06 | 3.71 | 234 |

FIG. 2 shows a plot of H2 recovery as a function of the total impurities in the hydrogen product on a volume basis for a selection of adsorbents. It can be seen that the hydrogen recovery for Na-mordenite and activated carbon, both of which have lower S(N2/Ar) values, is less sensitive to increasing product purity to the left of the plot. The hydrogen recovery for 72% CaX and 81% CaA is essentially equal to Na-mordenite at higher impurity levels, but drops off significantly at 100 ppm total impurities. At the higher hydrogen product purity levels, adsorbents with higher S(N2/Ar) values lose recovery as nitrogen pushes argon off of the adsorbent, and adsorbents with low $K_H$(Ar) values lack the argon capacity required for a high purity hydrogen product. Activated carbon has consistently lower recovery than Na-mordenite because activated carbon has low nitrogen capacity, as evidenced by the low $K_H$(N2) values. Low adsorbent capacity requires larger bed sizes which suffer from increased loss of hydrogen in the voids. Na-mordenite offers a surprising flexibility of performance at both high and low product purity due to a combination of high argon capacity ($K_H$(Ar)) and optimum S(N2/Ar).

Figure 3:
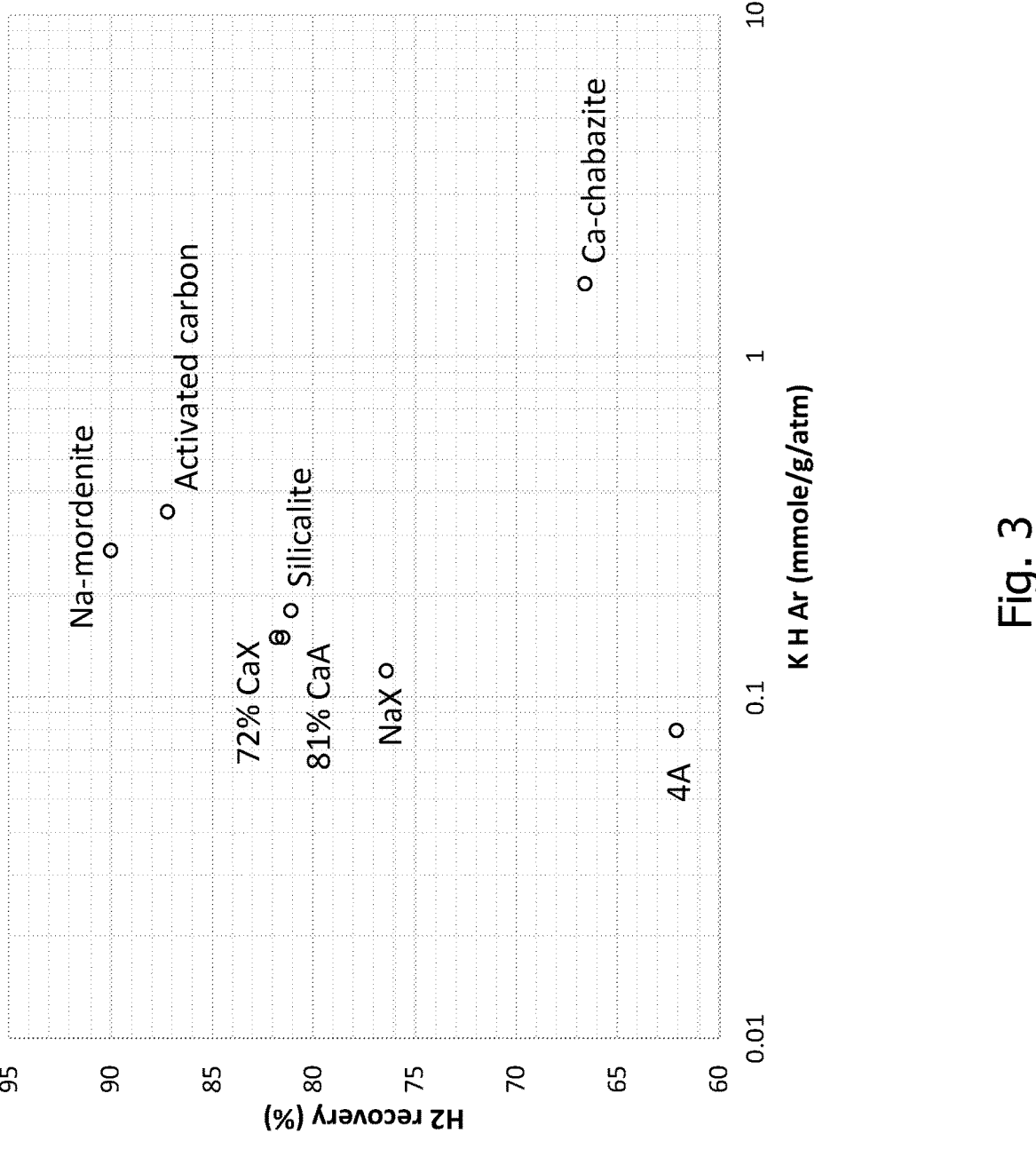
FIG. 3 shows a plot of H2 recovery at 100 ppm total impurity in the product as a function of Henry's law constant for Ar.

FIG. 3 shows a plot of H2 recovery at 100 ppm total impurity in the product hydrogen as a function of Henry's law constant for Ar. The significant dropoff in recovery at the very high $K_H$(Ar) value seen in Ca-chabazite illustrates that maximizing $K_H$(Ar) alone is not desired. Ca-chabazite has a very high S(N2/Ar) which makes it difficult for the adsorbent to hold on to argon. Note also the poor performance of NaX and 4A: although the N2/Ar selectivity for both is in the optimal range, the overall H2 recovery poor due to low $K_H$(Ar) values. For high overall H2 recovery, both the N2/Ar selectivity must be in the optimal range and the $K_H$(Ar) value must be above a minimum value. This finding contradicts previous work such as Johnson et al. (U.S. Pat. No. 6,302,943) which identified the key parameter as the $K_H$(N2) value ranging from 0.55 to 1.40 mmole/g/atm for N2 controlling cases.

Figure 4:
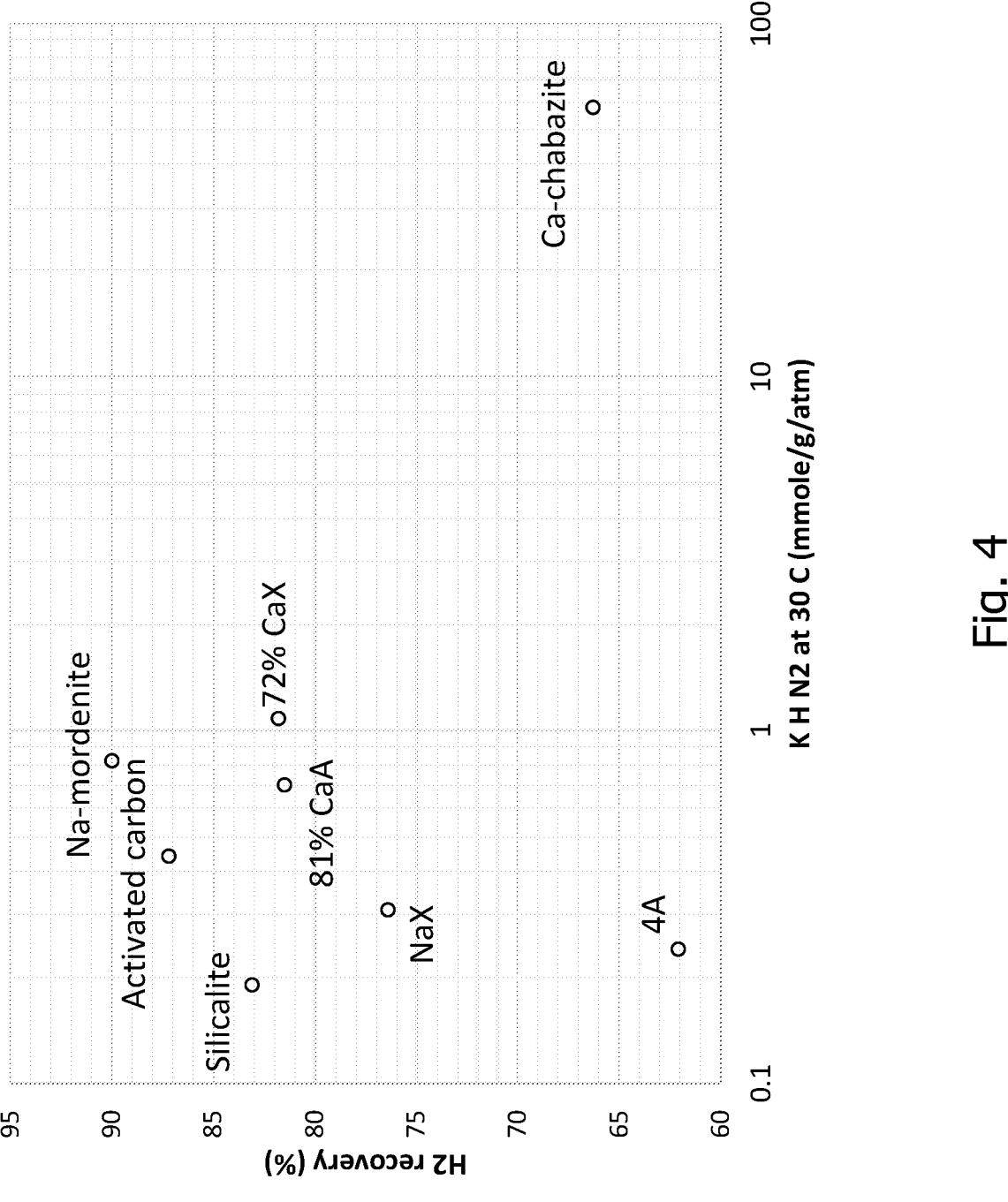
FIG. 4 shows a plot of H2 recovery at 100 ppm total impurity in the product as a function of Henry's law constant for N2.

FIG. 4 emphasizes the inability of the $K_H$(N2) value to predict adsorbent performance in this application. The plot of H2 recovery at 100 ppm total impurity in the product hydrogen as a function of Henry's law constant for N2 present a scatter plot over a wide range of recovery values.

Figure 5:
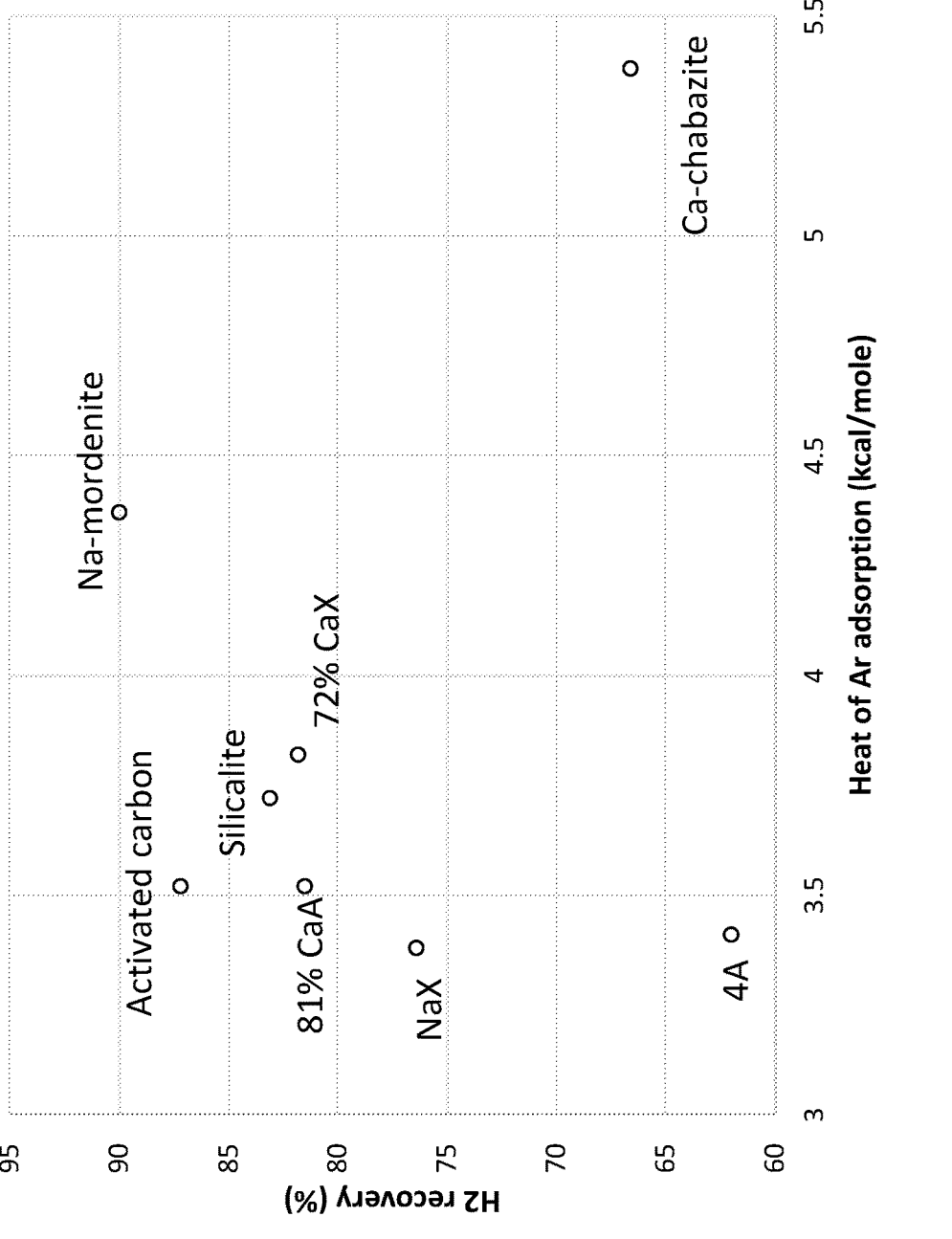
FIG. 5 shows a plot of H2 recovery at 100 ppm total impurity in the product as a function of the heat of adsorption of Ar.

FIG. 5 shows a plot of H2 recovery at 100 ppm total impurity in the product hydrogen as a function of the heat of adsorption of Ar. Na-mordenite again shows high recovery for heat of adsorption of argon ranging from 4 to 5 kcal/mol. In this range the adsorbents have sufficiently high capacity for argon without adsorbing argon so strongly that excessive amounts of purge are required.

Example 2

Additional simulations were conducted using the same simulation package and PSA process cycle as Example 1, however the adsorbents included a full bed of 81% CaA, a full bed of activated carbon as well as physical mixtures of 81% CaA and activated carbon. The percentage of activated carbon in the physical mixtures consisted of 20, 30, 40, 60, and 80% on a mass basis. The ratio of carbon to CaA was constant in each case along the length of the bed. The feed gas compositions tested included the same one used in Example 1 (97.68% H2, 0.74% N2, 0.05% Ar, 0.25% CH4, 0.24% CO2, and 1.04% CO (all on a mol basis) at 30 bar and 38° C., along with two higher Ar feeds containing 0.1% and 0.15% Ar, respectively. The H2 content of the feed was offset to account for the higher Ar levels. Table 3 shows the change in hydrogen recovery at 99.95% purity vs the percentage of carbon in the mixed bed. When the argon feed concentration is 0.05% a single bed of 81% CaA yields the best performance. However, as the argon feed concentration increases to 0.1% and higher, the bed consisting of a physical mixture of 81% CaA and activated carbon outperforms either the 81% CaA or activated carbon alone. So at feed inlet concentrations of argon above 0.1%, a physical mixture of activated carbon appears to be an optimal adsorbent layer.

TABLE 3

| | | | H2 recovery | | |
|---|---|---|---|---|---|
| C fraction | $K_H$ (Ar) @30 C. | S N2/Ar @30 C. | 0.05% Ar in feed | 0.1% Ar in feed | 0.15% Ar in feed |
| 0 | 0.15 | 4.5 | 92.7 | 90.0 | 87.7 |
| 20 | 0.19 | 3.3 | 92.2 | 91.2 | 89.6 |
| 30 | 0.21 | 2.9 | 91.9 | 91.2 | 90.0 |
| 40 | 0.23 | 2.6 | 91.5 | 91.0 | 90.3 |
| 60 | 0.27 | 2.0 | 90.8 | 90.5 | 90.1 |
| 80 | 0.31 | 1.6 | 90.1 | 89.8 | 89.6 |
| 100 | 0.35 | 1.3 | 89.5 | 89.4 | 89.3 |

Figure 6:
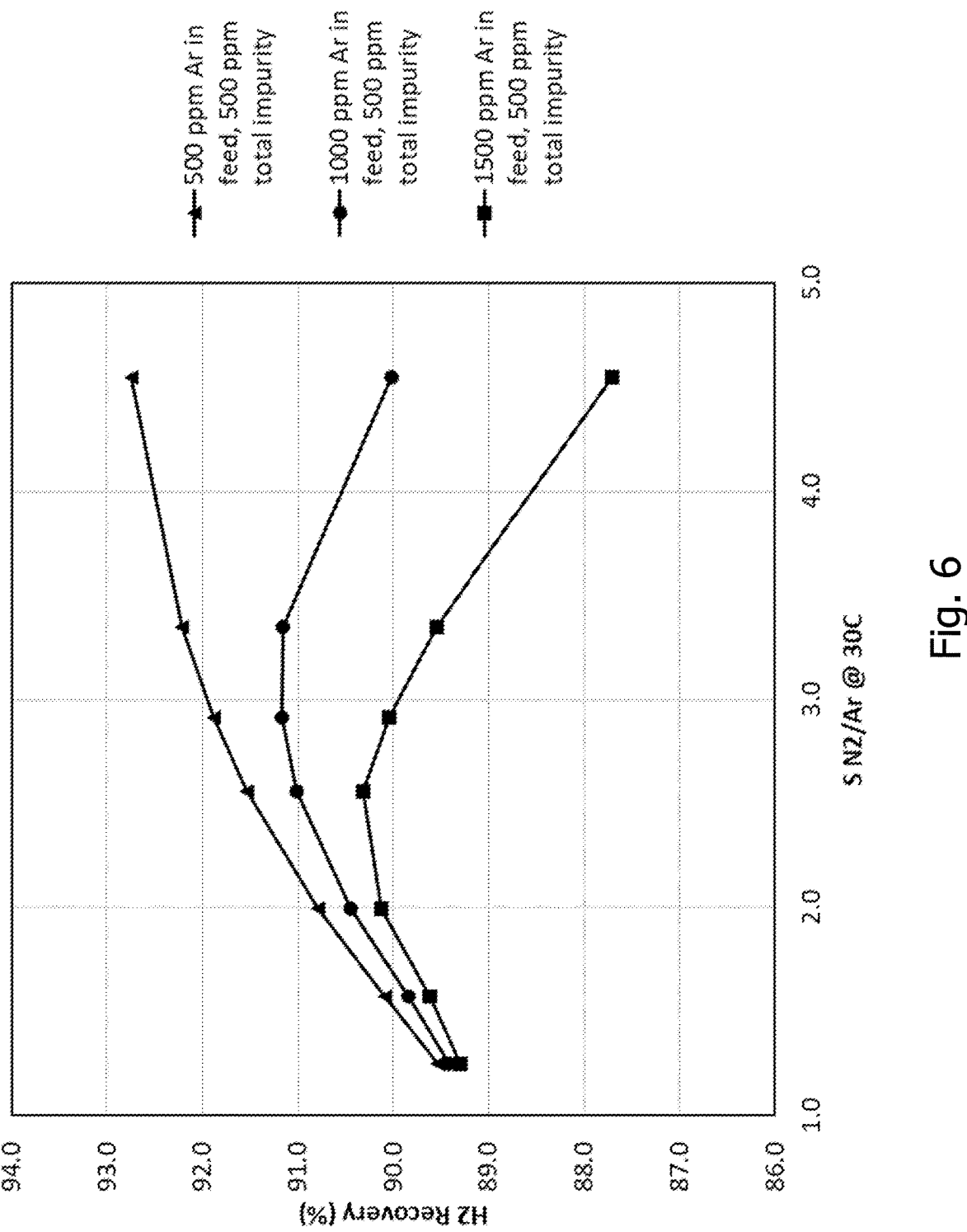
FIG. 6 shows a plot of H2 recovery at 500 ppm total impurity in the product as a function of the mass-averaged N2/Ar selectivity of the mixed adsorbent.

The mass-averaged Ar and N2 Henrys Law constants at 30 C were calculated as described previously for these mixed beds. The mass-averaged Ar Henrys Law constants range between 0.154 and 0.352 mmole/g/atm. The mass-averaged N2/Ar selectivites at 30 C were similarly calculated as described previously. The H2 recovery data are plotted versus the mass-averaged N2/Ar selectivites at 30 C in FIG. 6. It is clear that the H2 recovery is maximized when the mass-averaged N2/Ar selectivity at 30 C ranges from 2 to 4.

While the principles of the invention have been described above in connection with preferred embodiments, it is to be clearly understood that this description is made only by way of example and not as a limitation of the scope of the invention.

The invention claimed is:

1. A method for purifying a crude hydrogen feed stream comprising argon and nitrogen, the method comprising:
   feeding the crude hydrogen feed stream to an adsorption apparatus comprising a discharge end adsorption layer comprising a first adsorbent having a N2/Ar selectivity ranging from 2 to 4 at 30° C. and a Henry's law coefficient for argon ranging from 0.15 to 1.0 mmole/g/atma at 30° C.; and
   collecting a product gas from the adsorption apparatus.

2. The method of claim 1, wherein the product gas comprises less than or equal to 99.95% hydrogen by volume.

3. The method of claim 1, wherein the crude hydrogen feed stream comprises more than 90% hydrogen by volume.

4. The method of claim 1, wherein the crude hydrogen feed stream comprises more than 1% nitrogen by volume.

5. The method of claim 1, wherein the crude hydrogen feed stream comprises more than 0.01% argon by volume.

6. The method of claim 1, wherein the crude hydrogen feed stream comprises less than 1% CO by volume.

7. The method of claim 1, wherein the adsorption apparatus further comprises a feed end adsorption layer comprising a second adsorbent; wherein the second adsorbent has a Henry's law coefficient for argon greater than 0.3 mmole/g/atma at 30° C.

8. The method of claim 1, wherein the first adsorbent has a heat of adsorption of argon ranging from 4 to 5 kcal/mol.

9. The method of claim 1, wherein the first adsorbent has a silicon to aluminum ratio ranging from 2.5 to 50.

10. The method of claim 1, wherein the first adsorbent is exchanged with greater than or equal to 30% sodium ions.

11. The method of claim 1, wherein the first adsorbent comprises a physical mixture of two or more adsorbent materials.

12. The method of claim 1, wherein the first adsorbent has pore sizes ranging from 3.3 to 8 Å.

13. A method for purifying a crude hydrogen feed stream comprising argon and nitrogen, the method comprising:
   feeding the crude hydrogen feed stream to an adsorption apparatus comprising a discharge end adsorption layer comprising a first adsorbent having a silicon to aluminum ratio ranging from 2.5 to 50; and
   collecting a product gas from the adsorption apparatus;
   wherein the first adsorbent is exchanged with greater than or equal to 30% sodium ions.

14. The method of claim 13, wherein the first adsorbent has pore sizes ranging from 3.3 to 8 Å.

15. The method of claim 13, wherein the product gas comprises less than or equal to 99.95% hydrogen by volume.

16. The method of claim 13, wherein the crude hydrogen feed stream comprises more than 90% hydrogen by volume.

17. A method for purifying a crude hydrogen feed stream comprising argon and nitrogen, the method comprising:
   feeding the crude hydrogen feed stream to an adsorption apparatus comprising a discharge end adsorption layer comprising a first adsorbent having a silicon to aluminum ratio ranging from 2.5 to 50; and
   collecting a product gas from the adsorption apparatus;
   wherein the crude hydrogen feed stream comprises more than 0.01% argon by volume.

18. A method for purifying a crude hydrogen feed stream comprising argon and nitrogen, the method comprising:
   feeding the crude hydrogen feed stream to an adsorption apparatus comprising a discharge end adsorption layer comprising a first adsorbent having a silicon to aluminum ratio ranging from 2.5 to 50; and
   collecting a product gas from the adsorption apparatus;
   wherein the first adsorbent has a heat of adsorption of argon ranging from 4 to 5 kcal/mol.

* * * * *